R. G. HOBSON.

Plows.

No. 134,670.

Patented Jan. 7, 1873.

Witnesses.
C. F. Brown
M. Church

Inventor.
R. G. Hobson
by his Attys.
Hill & Ellsworth

UNITED STATES PATENT OFFICE.

RICHARD G. HOBSON, OF HOULKA, MISSISSIPPI.

IMPROVEMENT IN PLOWS.

Specification forming part of Letters Patent No. 134,670, dated January 7, 1873.

*To all whom it may concern:*

Be it known that I, RICHARD G. HOBSON, of Houlka, in the county of Chickasaw and State of Mississippi, have invented a new and useful Improvement in Plows; and I do hereby declare the following to be a full and exact description of the same, reference being had to the accompanying drawing forming part of this specification, in which—

Figure 1:
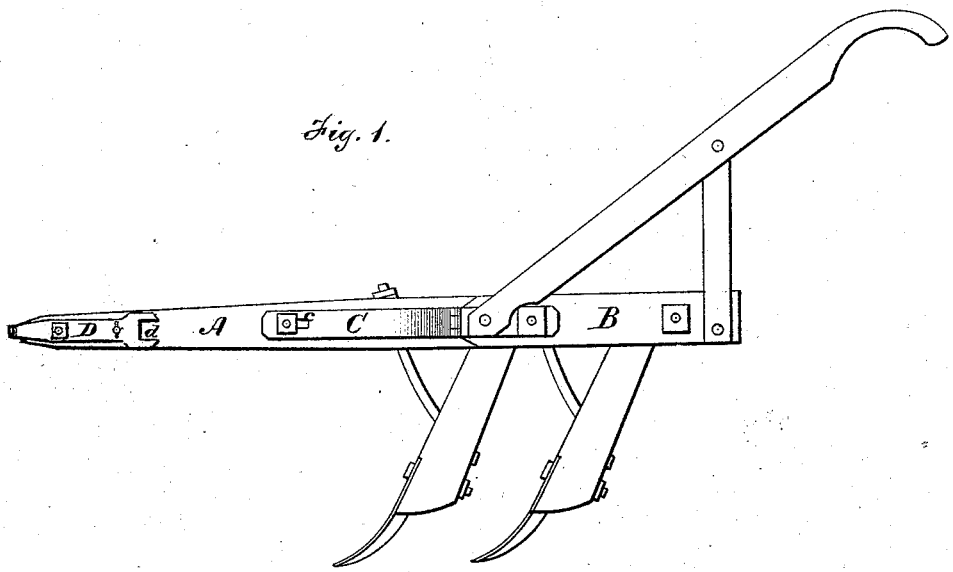
Figure 2:
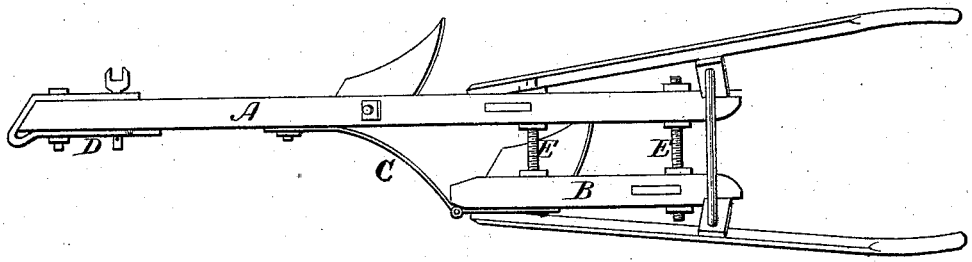

Figure 1 is a side elevation; and Fig. 2 is a top view.

Similar letters of reference in the accompanying drawing denote the same parts.

This invention has for its object to improve the construction of double plows in such manner that the beams may be set nearer together or further apart in order to the use of plows of different sizes and the accomplishment of work of different kinds.

In the drawing, A B are the beams, one long, the other short, placed parallel with each other and connected by two or more screw-bolts, E, passing crosswise through both beams, on each of which bolts are four nuts, two at the outside of the beams and two at the inside. A brace, C, is fastened to the outside of the shorter beam at its front end, and this brace has a hinge-joint in it just by the end of the beam, from which joint the brace proceeds to the inside of the other beam, to which it is fastened by a screw passing through a slot, $c$, in the brace.

As this machine is designed both for preparing land for seeding by means of large plows and also for cultivating the crop by means of smaller plows, it is necessary that the beams be placed further apart in the former case than in the latter. The screw-bolts and hinged brace allow such adjustment, the slotted end of the brace sliding along the side of the longer beam when the shorter beam is moved toward or from it.

The clevis D is constructed so as to put the draft on the left side of the longer beam, and has at its inner end a wrench, $d$, of a size to suit the large nuts used about the plow. The clevis-pin has a wrench, $e$, fitting the smaller nuts.

What I claim as new is—

The beams A B, when connected by the hinged and slotted spring-brace C, in combination with the screw-bolts E E, all constructed, arranged, and operated as set forth.

RICHARD G. HOBSON.

Witnesses:
 W. D. MCJUNKIN,
 WM. STEIN.